(12) United States Patent
Hackert et al.

(10) Patent No.: US 10,746,622 B2
(45) Date of Patent: Aug. 18, 2020

(54) METHOD FOR ADJUSTING A PRESSURE SENSOR IN AN SCR SYSTEM

(71) Applicant: Robert Bosch GmbH, Stuttgart (DE)

(72) Inventors: Annabel Hackert, Leonberg (DE); Marc Ringeisen, Ceske Budejovice (CZ); Stefan Nagel, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 207 days.

(21) Appl. No.: 16/024,900

(22) Filed: Jul. 1, 2018

(65) Prior Publication Data

US 2019/0003915 A1 Jan. 3, 2019

(30) Foreign Application Priority Data

Jun. 30, 2017 (DE) .................. 10 2017 211 216

(51) Int. Cl.
*G01L 27/00* (2006.01)
*F01N 3/20* (2006.01)
*F01N 11/00* (2006.01)

(52) U.S. Cl.
CPC .......... *G01L 27/002* (2013.01); *F01N 3/2066* (2013.01); *F01N 11/00* (2013.01); *F01N 11/002* (2013.01); *F01N 2550/05* (2013.01); *F01N 2610/02* (2013.01); *F01N 2610/144* (2013.01); *F01N 2610/148* (2013.01); *F01N 2900/12* (2013.01); *F01N 2900/1808* (2013.01)

(58) Field of Classification Search
CPC ...... G01L 27/002; F01N 11/00; F01N 11/002; F01N 3/2066; F01N 2610/144; F01N 2900/1808; F01N 2550/05; F01N 2610/148; F01N 2900/12; F01N 2610/02; F01N 3/208
See application file for complete search history.

(56) References Cited

U.S. PATENT DOCUMENTS

| | | | |
|---|---|---|---|
| 2008/0202104 A1* | 8/2008 | Ichikawa | F01N 3/2066 60/295 |
| 2009/0113877 A1 | 5/2009 | Van Nieuwstadt | |
| 2012/0237402 A1* | 9/2012 | Cantarelli | F02D 41/1448 422/111 |
| 2015/0139859 A1* | 5/2015 | Butzke | B01D 53/94 422/110 |

(Continued)

FOREIGN PATENT DOCUMENTS

| | | |
|---|---|---|
| DE | 10346220 A1 | 4/2005 |
| DE | 102004022115 A1 | 11/2005 |

(Continued)

*Primary Examiner* — Nathaniel T Woodward
(74) *Attorney, Agent, or Firm* — Michael Best & Friedrich LLP

(57) ABSTRACT

A method for adjusting a pressure sensor of an SCR system between a delivery pump and a dosing valve, with which the delivery pump is switched off during a switch-off phase of the SCR system and a pressure ($p_m$) measured by the pressure sensor is detected at least during a section of the switch-off phase in which the delivery pump is switched off, and the adjustment of the pressure sensor is carried out by using the measured pressure ($p_m$) as the reference pressure for the pressure sensor.

12 Claims, 3 Drawing Sheets

(56) References Cited

U.S. PATENT DOCUMENTS

2016/0131005 A1\* 5/2016 Bruck .................. F01N 3/2066
                                                                                                                    60/274

FOREIGN PATENT DOCUMENTS

| DE | 102008053275 A1 | 4/2010 |
| DE | 102012214369 A1 | 2/2014 |
| DE | 102014202038 A1 | 8/2015 |
| DE | 112014005284 T5 | 8/2016 |

\* cited by examiner

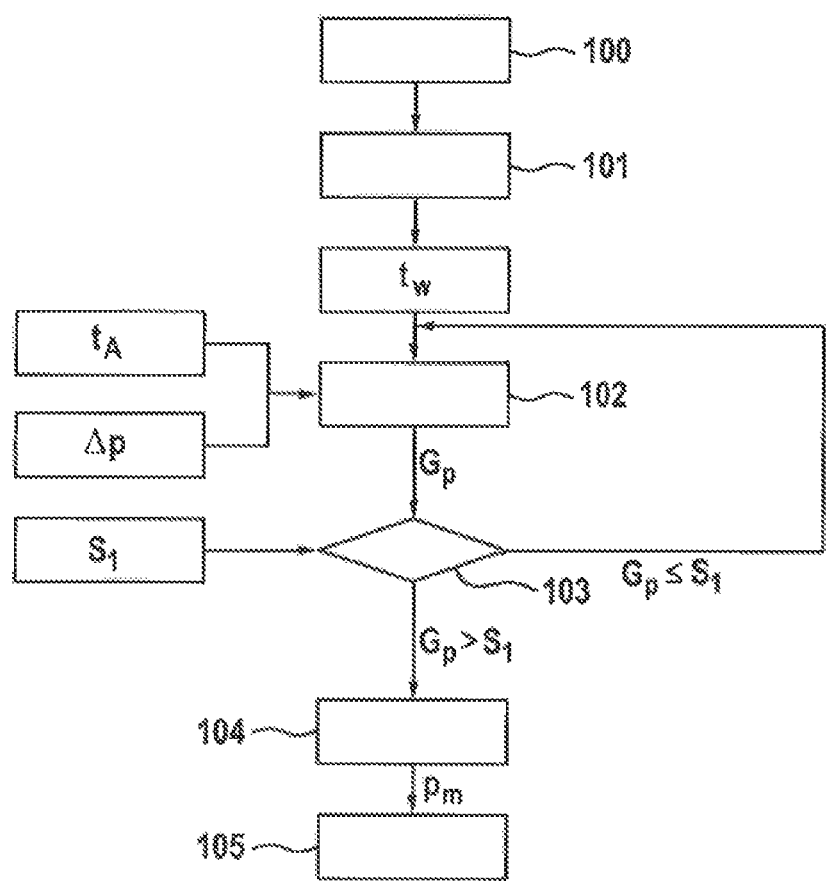

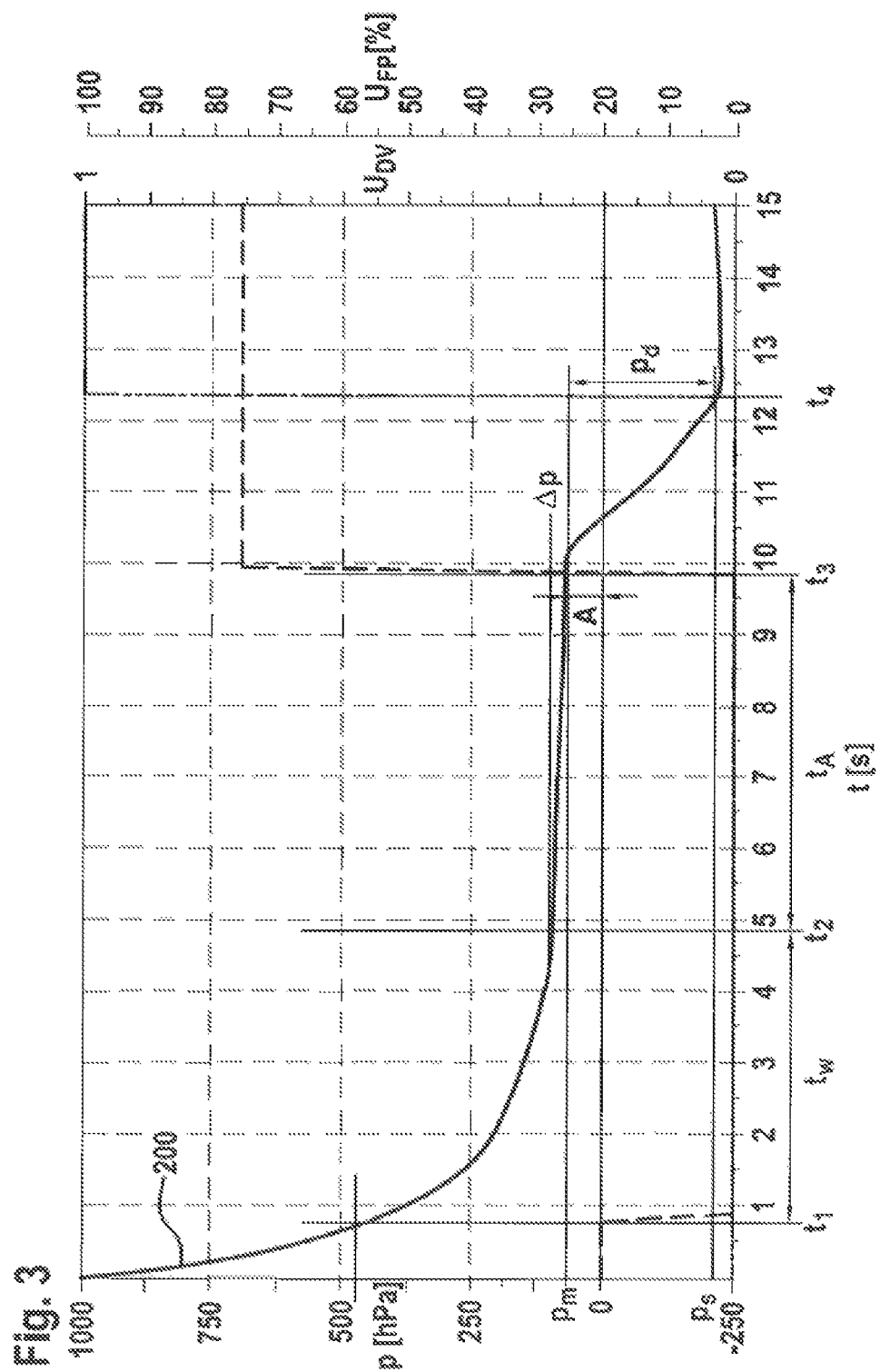

METHOD FOR ADJUSTING A PRESSURE SENSOR IN AN SCR SYSTEM

BACKGROUND OF THE INVENTION

The present invention concerns a method for adjusting a pressure sensor in an SCR system during a switch-off phase. The invention further concerns a computer program that carries out each step of the method when run on a computing device and a machine-readable memory medium that stores the computer program. Finally, the invention concerns an electronic control unit that is arranged to carry out the method according to the invention.

Methods and devices are known for operating a combustion engine, in particular in motor vehicles, in the exhaust region of which an SCR catalytic converter (Selective Catalytic Reduction) is disposed that reduces the oxides of nitrogen (NOx) contained in the exhaust gas of the combustion engine to nitrogen in the presence of a reagent. This enables the proportion of oxides of nitrogen in the exhaust gas to be considerably reduced. DE 103 46 220 A1 describes the basic principle. Ammonia (NH3) is required for the reaction process. As the reduction agent, reagents that separate NH3 are used, which are admixed with the exhaust gas. As a rule, for this purpose a 32.5% urea-water solution (HWL), also known commercially as AdBlue®, is used, which is metered into the exhaust gas system upstream of the SCR catalytic converter.

The reduction agent solution is usually stored in a reduction agent tank in the motor vehicle. For delivery and metering of the urea solution, in general a dosing system is provided comprising a delivery pump, a pressure line, a dosing module with a dosing valve, as well as the necessary sensor arrangement and an electronic control unit. The delivery pump transports the urea solution from the reduction agent tank via the pressure line into the dosing module. For dosing according to demand, the desired and necessary mass and/or volume of the reduction agent solution is metered into the exhaust gas system via the dosing valve.

Typically, a pressure sensor is used to monitor the system pressure. In order to ensure correct operation of said pressure sensor, the pressure measured by the pressure sensor is compared with a reference pressure, for example the ambient pressure.

DE 10 2012 214 369 A1 concerns an exhaust aftertreatment arrangement and a method for metering a reduction agent into the exhaust gas system of a combustion engine with a reduction agent tank. In this case, the pressure sensor detects a reduction agent pressure and compares the pressure measured by the pressure sensor with a reference pressure, for example the ambient pressure. By means of said comparison, when the combustion engine is started and with the reduction agent tank empty it can be determined whether the pressure sensor is operating properly. In a first step, by using the pressure sensor, when the combustion engine is started the reduction agent pressure can be compared with the ambient pressure. If the measured reduction agent pressure differs from the ambient pressure, then a malfunction of the pressure sensor can be concluded. It is therefore provided that the comparison with the ambient pressure is carried out with the combustion engine switched off in order to carry out an adjustment of the pressure sensor in the event of a restart of the combustion engine.

At low temperatures, the reduction agent solution freezes. For example, the freezing point of the frequently used solution AdBlue® is at approx. −11° C. Therefore, measures are provided in a switch-off phase of the SCR system to protect the SCR system at low temperatures against damage because of the freezing of the reduction agent solution. Typically, in the switch-off phase the reduction agent solution is returned into the reduction agent tank by means of the delivery pump or a return pump. In this case, the delivery pump or the return pump builds up a reduced pressure in the pressure line. By opening the dosing valve, the pressure line is ventilated and the reduction agent solution is sucked into the reduction agent tank.

DE 10 2014 202 038 A1 concerns a method for operating an SCR system in a motor vehicle. In particular, the method concerns such return suction or return transport of the reduction agent solution when the motor vehicle is turned off.

SUMMARY OF THE INVENTION

A method for adjusting a pressure sensor of an SCR system is proposed. The pressure sensor is disposed between a delivery pump and a dosing valve on the pressure side of the delivery pump and can measure a pressure there. The section of the SCR system monitored by the pressure sensor is connected to the surroundings, for example via a return line, so that pressure equalization with the ambient pressure can occur.

A switch-off phase of the SCR system is particularly well suited to the adjustment. The switch-off phase of the SCR system is carried out anyway to protect the SCR system against damage because of freezing of the reduction agent solution. During the switch-off phase of the SCR system, the reduction agent solution can be returned out of the SCR system into a reduction agent tank. In this case, a 4/2-way valve can be used, by means of which the transport direction of the delivery pump can be adjusted. The SCR system can be ventilated by opening the dosing valve while the delivery pump is producing a reduced pressure. It is to be noted here that the return by means of the delivery pump affects the pressure in the SCR system and consequently no reliable indication of the pressure during operation can be given.

With the method it is provided that the delivery pump is switched off within the switch-off phase of the SCR system, preferably at the start of the switch-off phase. Thereupon, the pressure is detected by means of the pressure sensor at least during a section of the switch-off phase of the SCR system in which the delivery pump is switched off. The adjustment of the pressure sensor is carried out then by using said measured pressure as a new reference pressure for the pressure sensor.

The ambient pressure surrounding the SCR system, therefore usually the atmospheric pressure, can advantageously be used as the reference pressure. In this case, pressure equalization with the ambient pressure can easily be achieved. The pressure in the pressure line can equalize with the ambient pressure, i.e. the atmospheric pressure, for example via the return line, with the delivery pump switched off. In other words, the pressure in the SCR system reaches the ambient pressure with the delivery pump switched off and a connection to the surroundings.

This is particularly advantageous if the pressure sensor is a relative pressure sensor. Said sensor measures a relative pressure as the difference between a pressure of the SCR system and the ambient pressure. If the delivery pump is switched off, the pressure in the SCR system equalizes with the ambient pressure via the connection to the surroundings. In the case of an ideal pressure sensor without defects, the expected measured pressure equals the ambient pressure and the relative pressure is therefore zero. Any deviation of the actual measured pressure can be detected as an erroneous deviation of the pressure sensor. The adjustment of the pressure sensor is carried out by using the measured pressure as the reference pressure for the pressure sensor, which gives the zero point for the relative pressure. Further pressure differences that occur in the switch-off phase of the SCR system and that are to be measured can finally be determined using said new zero point.

Likewise, this method can be used for absolute measurement pressure sensors. The pressure measured while the delivery pump is switched off is used as the reference pressure, i.e. for example as the ambient pressure, without having to know the real ambient pressure. The further pressures to be measured in the switch-off phase of the SCR system—such as for example pressure thresholds—can advantageously be measured as pressure differences relative to the ambient pressure. Because in the event of differences of the pressure both the minuend and the subtrahend are affected by the changed reference pressure, the two equalize and the pressure difference remains unchanged. As a result, the measured pressure can be used as the reference pressure for the further switch-off phase despite a possible deviation from the real reference pressure and without having to know the real reference pressure accurately, i.e. the ambient pressure. A characteristic curve of the pressure sensor can preferably be varied by means of an offset to take into account the deviation, even in the case of absolute pressure values.

Prior to the switch-off phase, the SCR system is typically operated with an overpressure in the pressure line. In the switch-off phase the overpressure reduces, after the delivery pump has been switched off, over a period of time before essentially equalizing to the ambient pressure. The gradient of the pressure in the pressure line can preferably be formed by forming the time derivative of the pressure or determining the change of the pressure over a fixed time period. Because the pressure is decreasing, the gradient is negative. If the gradient lies above a first threshold, it can be assumed that the pressure has essentially adjusted to the ambient pressure. Alternatively, the magnitude of the gradient can be formed. If the magnitude of the gradient lies below a second threshold, which in particular can be the positive value of the first threshold, it can be assumed that the pressure has essentially adjusted to the ambient pressure. The measured pressure for adjusting the pressure sensor can then preferably be detected. It can preferably be provided that the gradient is only formed during an adaptation phase, because prior to the adaptation phase it can be assumed that the gradient lies below the first threshold.

The computer program is arranged to carry out each step of the method, in particular if it is run on a computing device or control unit. It enables the implementation of the method in a conventional electronic control unit without having to carry out structural changes thereto. For this purpose, it is stored on the machine-readable memory medium.

Running the computer program on a conventional electronic control unit produces the electronic control unit that is arranged to carry out the adjustment of the pressure sensor.

BRIEF DESCRIPTION OF THE DRAWINGS

Exemplary embodiments of the invention are represented in the drawings and described in detail in the following description.

FIG. 2 shows a flow chart of an embodiment of the method according to the invention.

FIG. 3 shows a diagram of the pressure recorded by the pressure sensor, the actuation of a delivery pump and the actuation of a dosing valve against time, with which the adjustment of the pressure sensor by an embodiment of the method according to the invention is illustrated.

DETAILED DESCRIPTION

Figure 1:
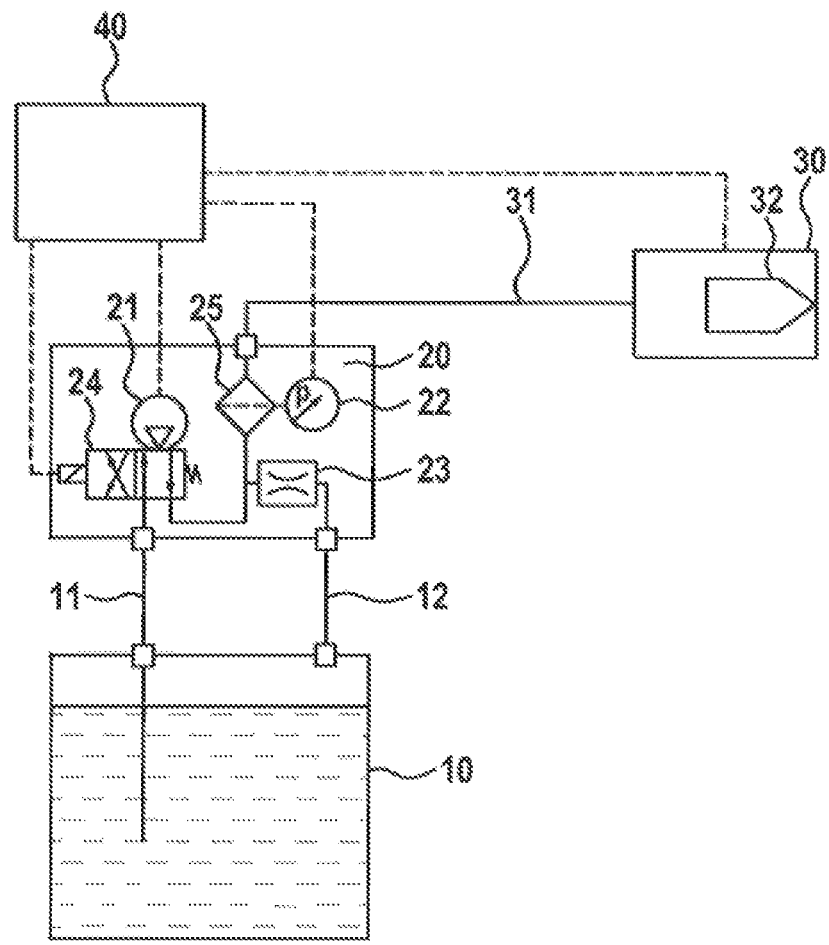
FIG. 1 shows an SCR system with a pressure sensor in a pressure line, for which adjustment is carried out by an embodiment of the method according to the invention.

An SCR system for an SCR catalytic converter (not shown) of a motor vehicle is shown in FIG. 1. The SCR system contains a reduction agent tank 10 for the reduction agent solution, a delivery module 20 and a dosing module 30. From the reduction agent tank 10, a suction line 11 leads to a delivery pump 21 of the delivery module 20. The liquid reduction agent solution passes via a filter 25 and an outlet in a pressure line 31 to a dosing valve 32 of the dosing module 30 and is metered in a demand-dependent manner into the exhaust gas system of a combustion engine (not shown) upstream of the SCR catalytic converter. Moreover, a return line 12 with a choke 23 leads from the delivery module 20 back into the reduction agent tank 10. Consequently, the SCR system is connected to the surroundings via said return line 12. A 4/2-way valve 24, by means of which the transport direction of the delivery pump 21 can be adjusted, is disposed on the delivery pump 21. In a delivery mode, the delivery pump 21 transports the reduction agent solution from the reduction agent tank 10 to the dosing module 30. In a return suction mode, the reduction agent solution is transported back from the SCR system via the suction line 11 into the reduction agent tank 10.

Furthermore, a pressure sensor 22 is provided on the pressure side of the delivery pump 21 between said pump and the dosing valve 30. In one exemplary embodiment, the pressure sensor 22 is disposed in the delivery module 20 and is associated with the filter 25. The pressure sensor 22 is embodied here as a relative pressure sensor and measures a relative pressure p of the SCR system relative to the ambient pressure. In a further exemplary embodiment, the pressure sensor 22 can also be embodied as an absolute pressure sensor that measures the absolute pressure in the SCR system. The pressure sensor 22 is connected to an electronic control unit 40 and sends the measured pressure values thereof to said electronic control unit 40. The electronic control unit is further connected to the delivery pump 21, the 4/2-way valve 24 and the dosing valve 32 and can control said devices.

FIG. 2 shows a flow chart of an embodiment of the method according to the invention. The SCR system is in a switch-off phase 100, in which the delivery module 20, the pressure line 31 and the dosing module 30 are emptied in order to protect said components against damage due to freezing of the reduction agent solution. According to the invention, the delivery pump 12 is switched off 101 during said switch-off phase 100. Following this, a waiting time $t_A$ is waited, in which the pressure in the pressure line 31 reduces from an overpressure and essentially equalizes with the ambient pressure. A profile 200 of the pressure p measured by the pressure sensor 22 against time t is shown in FIG. 3 and is described in detail in the associated description. During an adaptation time $t_A$, the gradient $G_p$ of the pressure p is formed 102. For this purpose, the pressure difference $\Delta p$ that occurs during said adaptation time $t_A$ is recorded by means of the pressure sensor 22 and is divided by the adaptation time $t_A$. In other exemplary embodiments, the time derivative of the pressure p is formed in order to calculate the gradient $G_p$. Because the pressure p is decreasing, the gradient $G_p$ is negative. In a comparison 103, the gradient $G_p$ is compared with a first threshold $S_1$. If the gradient $G_p$ lies above the first threshold $S_1$, it is assumed that the pressure p has essentially equalized with the ambient pressure. In a further exemplary embodiment, the magnitude of the gradient $G_p$ of the pressure p is formed and then compared with a second threshold in the comparison of the magnitude of the gradient $G_p$. The second threshold $S_2$ can for example be the positive value of the first threshold $S_1$. The pressure sensor 22 now measures 104 the prevailing pressure. Said measured pressure $p_m$ would indicate the ambient pressure as the reference pressure in the case of an ideal pressure sensor 22 without any defects. In the case of a faulty pressure sensor 22, the measured pressure $p_m$ indicates a deviation A from the reference value. The measured pressure $p_m$ is finally used 105 as a new reference pressure for said pressure sensor 22. In other words, the erroneous value of the measured pressure $p_m$ is specified as the new reference value and the pressure sensor 22 is readjusted as a result.

FIG. 3 shows a diagram of a profile 200 of the pressure p that is recorded by the pressure sensor 22 against time t during the switch-off phase 100 of the SCR system. The pressure sensor 22 is embodied as a relative pressure sensor and measures a relative pressure p of the SCR system relative to ambient pressure. On the scale of the pressure, 0 consequently represents the ambient pressure as the reference pressure. In addition, the actuation $U_1$ of the delivery pump 21 and the actuation $U_{DV}$ of the dosing valve 32 are represented in said diagram. The actuation $U_{FP}$ of the delivery pump 21 is scaled in percentage form, wherein 0% means that the delivery pump 21 is switched off. To put it simply, the actuation $U_{DV}$ of the dosing valve 32 comprises two states 0 and 1, wherein the state 0 means that the dosing valve 32 is closed, and the state 1 means that the dosing valve 32 is open.

At the start, there is an overpressure in the pressure line 31 that results from the operation of the SCR system that is carried out before the switch-off phase 100. As already described, the pressure p initially decreases and essentially equals the ambient pressure. The profile 200 of the pressure p basically describes an exponential decrease. For a detailed description of the following steps, refer to the flow chart in FIG. 2. Relative to the start of the switch-off phase 100, after approx. 0.8 seconds at a first point in time $t_1$ the delivery pump 21 is stopped 101. A waiting time $t_w$ of approx. 4 seconds is waited, in which the pressure p decreases further. At a second point in time $t_2$ at approx. 4.8 seconds, an adaptation phase is started, in which the gradient $G_p$ of the pressure p is formed over the adaptation time $t_A$ of approx. 5 seconds 102. It can be seen in said diagram that because of the exponential decrease of the pressure p the gradient $G_p$ is always negative and the magnitude of the gradient $G_p$ decreases at least until the end of the adaptation time $t_A$. Consequently, the gradient $G_p$ adopts ever decreasing negative values while the pressure p is decreasing, i.e. in other words it is larger. It can be seen that the profile 200 of the pressure p hardly changes in the adaptation phase, in particular at the end thereof, which indicates that the ambient pressure has essentially been reached. If the gradient $G_p$ is above the first threshold $S_1$, the measured pressure $p_m$ is finally determined 104 and is approx. 50 bar (relative pressure) in this example. The adaptation time $t_A$ can in principle be extended arbitrarily in order to ensure that the gradient $G_p$ exceeds said first threshold $S_1$. The pressure $p_m$ measured by the pressure sensor 22 has a deviation A of approx. 50 hPa from the actual ambient pressure, which had to be p=0. In order to remove said deviation A, the measured pressure $p_m$ is used 105 as the new reference value for the pressure sensor 22, therefore as the ambient pressure. In other words, the scale for the pressure p is shifted. According to one exemplary embodiment, a characteristic curve of the pressure sensor 22 can be changed by means of an offset with the magnitude of the deviation A for this purpose.

At a third point in time $t_3$ at approx. 9.8 seconds, the delivery pump 12 is switched on 25 and the pressure p decreases further, so that a reduced pressure is formed in the pressure line. Said reduced pressure is detected by determining a pressure difference $p_d$ from the measured pressure $p_m$ with the delivery pump 21 switched off. I.e., the pressure difference $p_d$ is a pressure difference from the reference pressure. Because in the event of differences of the pressure both the minuend and the subtrahend are affected by the changed reference pressure, the two equalize and the pressure difference remains unchanged, so the real pressure does not have to be known exactly. Thus, this method is suitable both for a relative pressure sensor and for an absolute pressure sensor. If only pressure differences are used in the switch-off phase 100, the change in the characteristic curve can be omitted. If, as in this example, the pressure difference $p_d$ is approx. 250 hPa (between 50 hPa and −200 hPa), at a fourth point in time $t_4$ after approx. 2.5 seconds, the reduced pressure is large enough for ventilation of the SCR system and the dosing valve 32 can be opened.

The invention claimed is:

1. A method for adjustment of a relative pressure sensor (22) of an SCR system between a delivery pump (21) and a dosing valve (32), with which the delivery pump (21) is switched off (101) during a switch-off phase (100) of the SCR system and a pressure ($p_m$) measured by the relative pressure sensor (22) is detected (104) at least during a section of the switch-off phase (101) in which the delivery pump (21) is switched off, and the adjustment of the relative pressure sensor is carried out by using (105) the measured pressure ($p_m$) as an ambient pressure for the relative pressure sensor (22), wherein the relative pressure sensor that measures a relative pressure (p) between a pressure of the SCR system and the ambient pressure and the adjustment of the relative pressure sensor (22) is carried out by using (105) the measured pressure ($p_m$) as the zero point for the relative pressure.

2. A computer program that is arranged to carry out each step of the method according to claim 1.

3. A machine-readable memory medium, on which a computer program according to claim 1 is stored.

4. An electronic control unit (40) that is arranged to adjust the relative pressure sensor (22) by means of a method according to claim 1.

5. The method according to claim 1, characterized in that in a return suction mode, a reduction agent solution is transported back from the SCR system to a tank.

6. A method for adjustment of a pressure sensor (22) of an SCR system between a delivery pump (21) and a dosing valve (32), with which the delivery pump (21) is switched off (101) during a switch-off phase (100) of the SCR system and a pressure ($p_m$) measured by the pressure sensor (22) is detected (104) at least during a section of the switch-off phase (101) in which the delivery pump (21) is switched off, and the adjustment of the pressure sensor is carried out by using (105) the measured pressure (p) as a reference pressure for the pressure sensor (22), characterized in that the measured pressure ($p_m$) for the adjustment is detected when the gradient ($G_p$) of a pressure profile (200) of the pressure sensor lies above a first threshold ($S_1$).

7. The method according to claim 6, characterized in that the gradient ($G_p$) of the pressure profile (200) is formed (102) during an adaptation phase.

8. A computer program that is arranged to carry out each step of the method according to claim 6.

9. A machine-readable memory medium, on which a computer program according to claim 6 is stored.

10. An electronic control unit (40) that is arranged to adjust the pressure sensor (22) by means of a method according to claim 6.

11. The method according to claim 6, wherein the reference pressure is an ambient pressure.

12. The method according to claim 6, characterized in that in a return suction mode, a reduction agent solution is transported back from the SCR system to a tank.

\* \* \* \* \*